United States Patent … Kim et al.

(10) Patent No.: US 9,505,370 B2
(45) Date of Patent: Nov. 29, 2016

(54) AIRBAG APPARATUS

(71) Applicant: HYNDAI MOBIS Co., Ltd., Yongin-si, Gyeonggi-do (KR)

(72) Inventors: Su Hyun Kim, Yongin-si (KR); Jung Su Lee, Yongin-si (KR); Hun Hee Jeong, Yongin-si (KR)

(73) Assignee: HYUNDAI MOBIS., LTD., Yongin-si, Gyeonggi-do (KR)

(*) Notice: Subject to any disclaimer, the term of this patent is extended or adjusted under 35 U.S.C. 154(b) by 0 days.

(21) Appl. No.: 14/747,102

(22) Filed: Jun. 23, 2015

(65) Prior Publication Data
US 2016/0001733 A1 Jan. 7, 2016

(30) Foreign Application Priority Data

| Jul. 3, 2014 | (KR) | 10-2014-0083307 |
| Aug. 7, 2014 | (KR) | 10-2014-0101825 |
| Oct. 29, 2014 | (KR) | 10-2014-0148534 |

(51) Int. Cl.
B60R 21/233 (2006.01)
B60R 21/239 (2006.01)
B60R 21/2338 (2011.01)

(52) U.S. Cl.
CPC ........... *B60R 21/233* (2013.01); *B60R 21/239* (2013.01); *B60R 21/2338* (2013.01); *B60R 2021/2395* (2013.01); *B60R 2021/23308* (2013.01); *B60R 2021/23316* (2013.01); *B60R 2021/23382* (2013.01); *B60R 2021/23384* (2013.01); *B60R 2021/23388* (2013.01)

(58) Field of Classification Search
CPC ............ B60R 21/233; B60R 21/2338; B60R 21/239; B60R 2021/23384; B60R 2021/23316; B60R 2021/23382; B60R 2021/23308; B60R 2021/23388; B60R 2021/2395

See application file for complete search history.

(56) References Cited

U.S. PATENT DOCUMENTS

| 7,762,576 B2* | 7/2010 | Cho | B60R 21/231 280/729 |
| 8,181,988 B2* | 5/2012 | Adachi | B60R 21/233 280/729 |
| 9,205,798 B1* | 12/2015 | Jindal | B60R 21/16 |
| 2007/0205591 A1* | 9/2007 | Bito | B60R 21/233 280/743.2 |
| 2010/0013197 A1* | 1/2010 | Adachi | B60R 21/233 280/728.1 |
| 2011/0254256 A1* | 10/2011 | Mendez | B60R 21/2338 280/743.2 |
| 2012/0306187 A1* | 12/2012 | Mendez | B60R 21/2338 280/743.2 |
| 2014/0217712 A1* | 8/2014 | Nakamura | B60R 21/2338 280/739 |
| 2015/0158452 A1* | 6/2015 | Choi | B60R 21/233 280/732 |
| 2015/0239424 A1* | 8/2015 | Nebel | B60R 21/2338 280/729 |
| 2015/0298643 A1* | 10/2015 | Schneider | B60R 21/233 280/729 |

* cited by examiner

*Primary Examiner* — Drew Brown
(74) *Attorney, Agent, or Firm* — Paratus Law Group, PLLC

(57) ABSTRACT

According to an airbag apparatus according to exemplary embodiments of the present invention, at the time of an accident of a vehicle, a sub-cushion protrudes toward a front side of a main cushion to prevent a head of an occupant from sliding toward a lateral side, thereby preventing the head of the occupant, which is in contact with the main cushion, from sliding toward a lateral side even though the vehicle collides with an object obliquely with respect to a direction in which the vehicle travels.

9 Claims, 20 Drawing Sheets

AIRBAG APPARATUS

CROSS-REFERENCE TO RELATED APPLICATIONS

The present application claims priority to Korean Patent Application Number 10-2014-0083307 filed Jul. 3, 2014, and Korean Patent Application Number 10-2014-0101825 filed Aug. 7, 2014, and Korean Patent Application Number 10-2014-0148534 filed Oct. 29, 2014, the entire contents of which the application is incorporated herein for all purposes by this reference.

TECHNICAL FIELD

The present invention relates to an airbag apparatus, and more particularly, to an airbag apparatus that protects an occupant seated in a front passenger seat.

BACKGROUND

In general/various types of safety devices are provided in a vehicle in order to protect occupants seated in seats, and an airbag is provided as a representative safety device.

The airbag is designed so that the airbag is deployed by pressure at which an adult person having typical weight (for example, 65 kg) may be protected.

Meanwhile, while only adult persons having typical weight are seated in the driver seat, various occupants such as infants, children, and adult persons having weight lower than the typical weight as well as adult persons having typical weight are seated in a front passenger seat.

Therefore, in the case of the airbag for a front passenger seat, it is necessary to vary deployment pressure in accordance with the type of occupant. In order to vary deployment pressure in accordance with the type of occupant, a method of adjusting an amount of gas discharged from the airbag and a method of installing a sub-cushion having a separate chamber in the airbag are used for the airbag for a front passenger seat.

FIG. 1 is a view for explaining a problem with an airbag according to the related art.

Referring to FIG. 1, in the case of the airbag for a front passenger seat, when a vehicle 1 collides with an object obliquely at an angle a with respect to a direction in which the vehicle 1 travels instead of undergoing a head-on collision, there is a problem in that even though the deployment pressure is adjusted as described above, a head of the passenger deviates from the airbag while sliding toward one side of the airbag after coming into contact with the airbag, and then collides with a center fascia.

SUMMARY

The present invention has been made in an effort to provide an airbag apparatus capable of preventing a head of an occupant, which is in contact with a main cushion, from sliding toward a lateral side.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: a main cushion which is inflated when gas flows into the main cushion to be deployed forward toward an occupant; a sub-cushion which is disposed in the main cushion and inflated by gas pressure in the main cushion to protrude toward a front surface of the main cushion; and a sub-cushion deployment timing adjusting means which is coupled to the main cushion, and adjusts a point of time at which the sub-cushion protrudes toward the front surface of the main cushion.

Other detailed matters of the exemplary embodiment are included in the detailed description and the drawings.

According to the airbag apparatus according to the exemplary embodiments of the present invention, at the time of an accident of the vehicle, the sub-cushion protrudes toward the front side of the main cushion to prevent the head of the occupant from sliding toward a lateral side, thereby preventing the head of the occupant which is in contact with the main cushion, from sliding toward a lateral side even though the vehicle collides with an object obliquely with respect to a direction in which the vehicle travels.

The effect of the present invention is not limited to the aforementioned effect, and other effects, which are not mentioned above, will be clearly understood by those skilled in the art from the claims.

DETAILED DESCRIPTION

Figure 1:
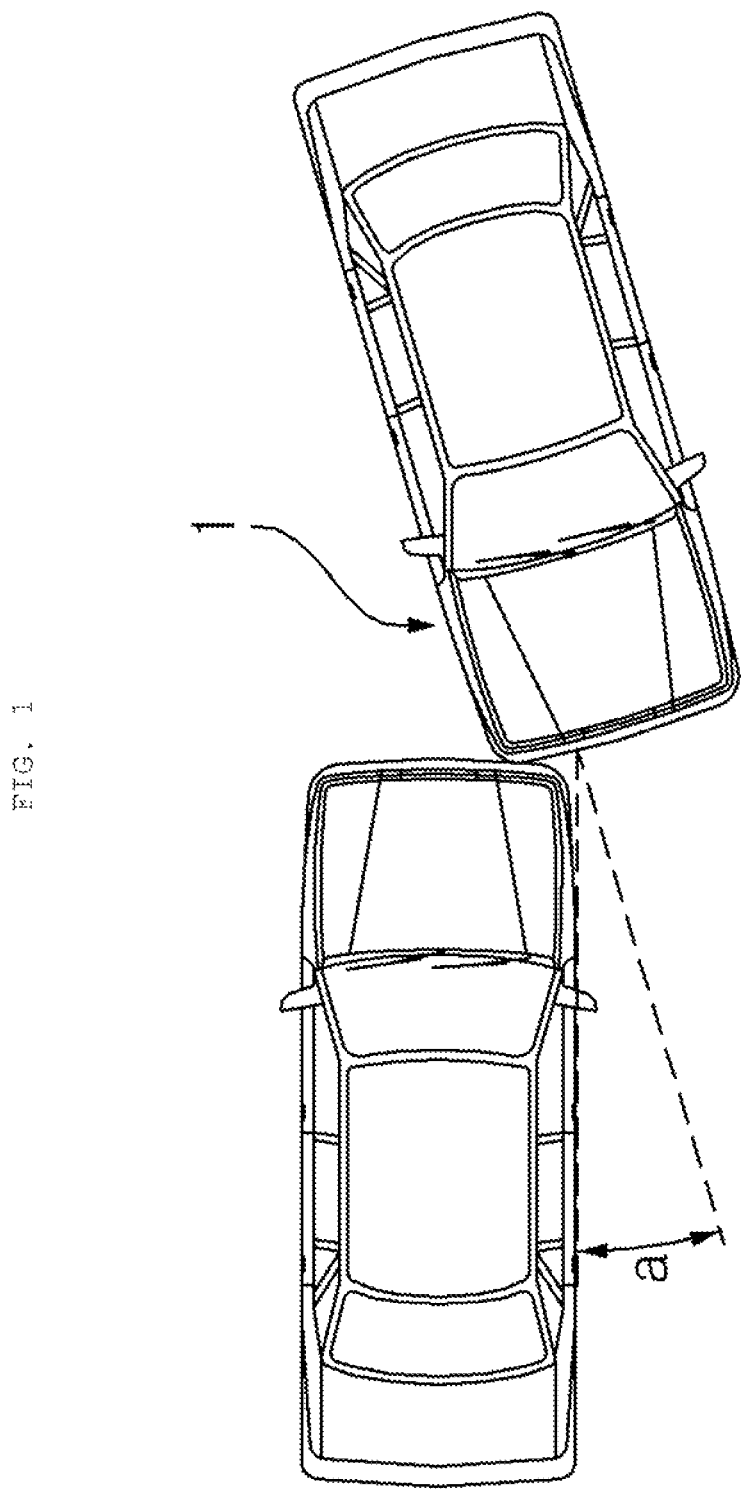
FIG. 1 is a view for explaining a problem with an airbag according to the related art.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to exemplary embodiments of the present invention will be described with reference to the drawings.

Figure 2:
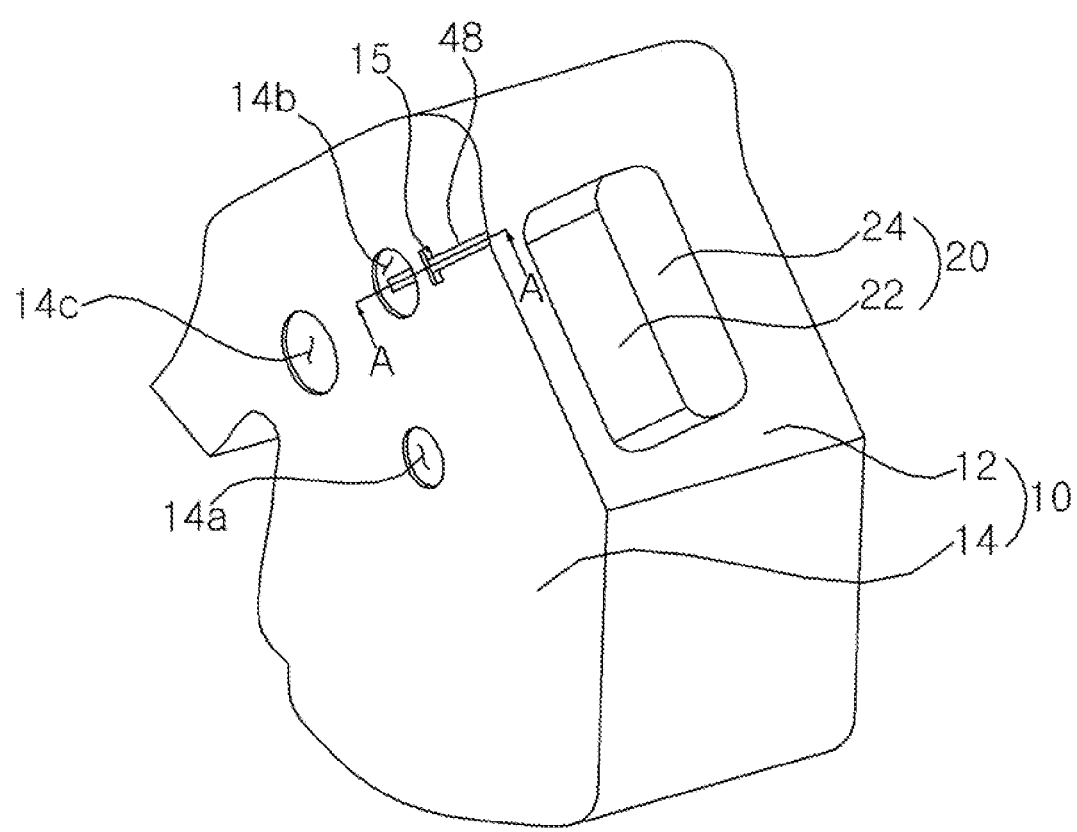
FIG. 2 is a view illustrating an airbag of an airbag apparatus according to a first exemplary embodiment of the present invention.

FIG. 2 is a view illustrating an airbag of an airbag apparatus according to a first exemplary embodiment of the present invention.

Referring to FIG. 2, an airbag apparatus according to the first exemplary embodiment of the present invention includes airbags 10 and 20 which are inflated when gas flows into the airbags 10 and 20. The airbags 10 and 20 include a main cushion 10, and a sub-cushion 20 coupled to the main cushion 10.

An inflator (not illustrated), which generates gas, is coupled to a rear surface of the main cushion 10. The main cushion 10 is inflated when gas generated by the inflator flows into the main cushion 10, and deployed forward toward an occupant. When the main cushion 10 is fully deployed forward, a head and a chest of the occupant come into contact with a front surface of the main cushion 10, such that the occupant is protected by cushioning force of the main cushion 10.

The main cushion 10 is manufactured by using three flexible panels. That is, the main cushion 10 includes a main panel 12 which is disposed at a center of the main cushion 10 and comes into contact with the head and the chest of the occupant, and side panels 14 which are coupled to both sides of the main panel 12, respectively, and define lateral surfaces of the main cushion 10.

Three vent holes 14a, 14b, and 14c, which discharge gas in the main cushion 10 to the outside to adjust pressure in the main cushion 10, are formed in the side panel 14 that defines the lateral surface of the main cushion 10. The vent holes 14a, 14b, and 14c include a main vent hole 14a, a sub-vent hole 14b, and a low risk deployment (LRD) vent hole 14c. The main vent hole 14a is always opened from when the main cushion 10 is initially deployed and even after the main cushion 10 is fully inflated, thereby always discharging gas in the main cushion 10.

The sub-vent hole 14b is closed when the main cushion 10 is initially deployed, and opened immediately before the main cushion 10 is fully inflated and the head and the chest of the occupant come into contact with the front surface of the main cushion 10. The sub-vent hole 14b serves to protect an occupant (e.g., an adult person), who has a body sized so that a head and a chest may come into contact with the front surface of the main cushion 10, with appropriate pressure.

The LRD vent hole 14c is opened when the main cushion 10 is initially deployed, and gradually closed as the main, cushion. 10 is fully inflated. The LED vent hole 14c serves to prevent an occupant (e.g., an infant), who has a body sized so that a head and a chest cannot come into contact with the front surface of the main cushion 10, from falling under a lower surface of the main cushion 10 and being injured.

The sub-cushion 20 is disposed in the main cushion 10, and protrudes toward the front surface of the main cushion 10 while being inflated by gas flowing into the main cushion 10. The sub-cushion 20 protrudes toward a position that is biased toward one side of the front surface of the main cushion 10. Therefore, when the sub-cushion 20 protrudes toward the front surface of the main cushion 10, the head and the chest of the occupant, which are in contact with the main cushion 10, are prevented by the sub-cushion 20 from being moved toward a lateral side. Therefore, even though the vehicle collides with an object obliquely at an angle with respect to a direction in which the vehicle travels, the head and the chest of the occupant, which are in contact with the main cushion 10, do not slide toward a lateral side due to the sub-cushion 20, such that the head and the chest of the occupant do not collide with a center fascia that is a structure in the vehicle.

The sub-cushion 20 is manufactured by using two flexible panels. That is, the sub-cushion 20 includes a first panel 22 which is formed in an annular shape, and has one side that is in communication with an internal space of the main cushion 10 and the other side that is opened, and a second panel 24 which shields the opened other side of the first panel 22 and is coupled to the first panel 22. A degree to which the sub-cushion 20 protrudes toward the main cushion 10 may be adjusted by adjusting a height of the first panel 22.

Figure 3:
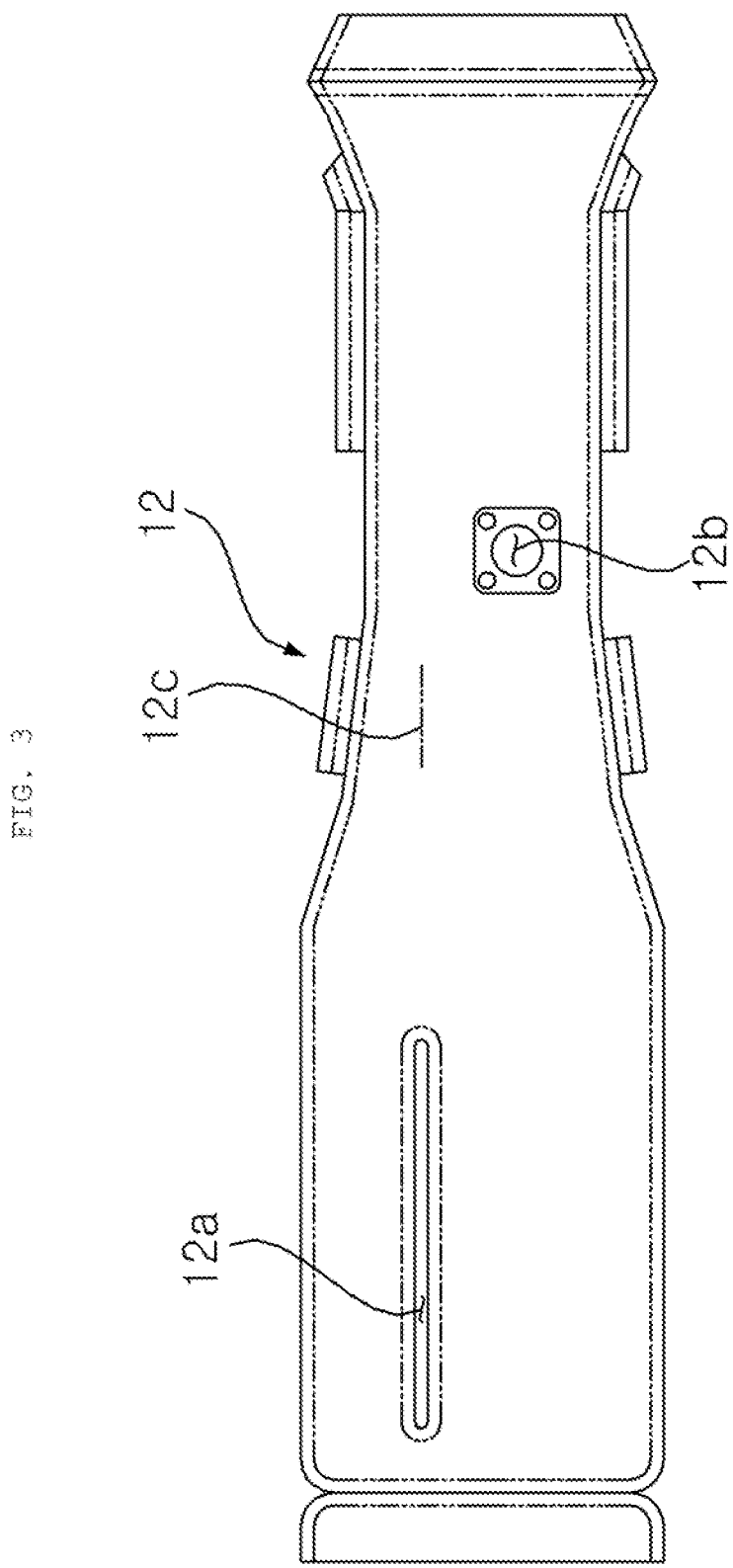
FIG. 3 is a view illustrating a state in which a main panel of a main cushion illustrated in FIG. 2 is spread out before being manufactured as the airbag.

FIG. 3 is a view illustrating a state in which the main panel of the main cushion illustrated in FIG. 2 is spread out before being manufactured as the airbag.

Referring to FIG. 3, a cut-out hole 12a is formed at a portion of the main panel 12 which defines the front surface of the main cushion 10. The sub-cushion 20 is disposed in the main cushion 10, and may protrude through the cut-out hole 12a toward the front surface of the main cushion 10 while being inflated by gas in the main cushion 10. In the present exemplary embodiment, the sub-cushion 20 shields the cut-out hole 12a of the main cushion 10 inside the main cushion 10, and is coupled to the main cushion 10, such that the sub-cushion 20 is inflated by gas in the main cushion 10, and protrudes through the cut-out hole 12a toward the front surface of the main cushion 10. That is, the opened one side of the first panel 22 is coupled to the main panel 12 by sewing along a circumference of the cut-out hole 12a, such that the sub-cushion 20 may be coupled to the main cushion 10 while shielding the cut-out hole 12a.

An inflator insertion hole 12b is formed at a portion of the main panel 12 which defines the rear surface of the main cushion 10. A head portion of the inflator, which discharges gas, may be inserted into the main cushion 10 through the inflator insertion hole 12b, and then may be coupled to the main panel 12 by bolts and nuts.

Figure 4:
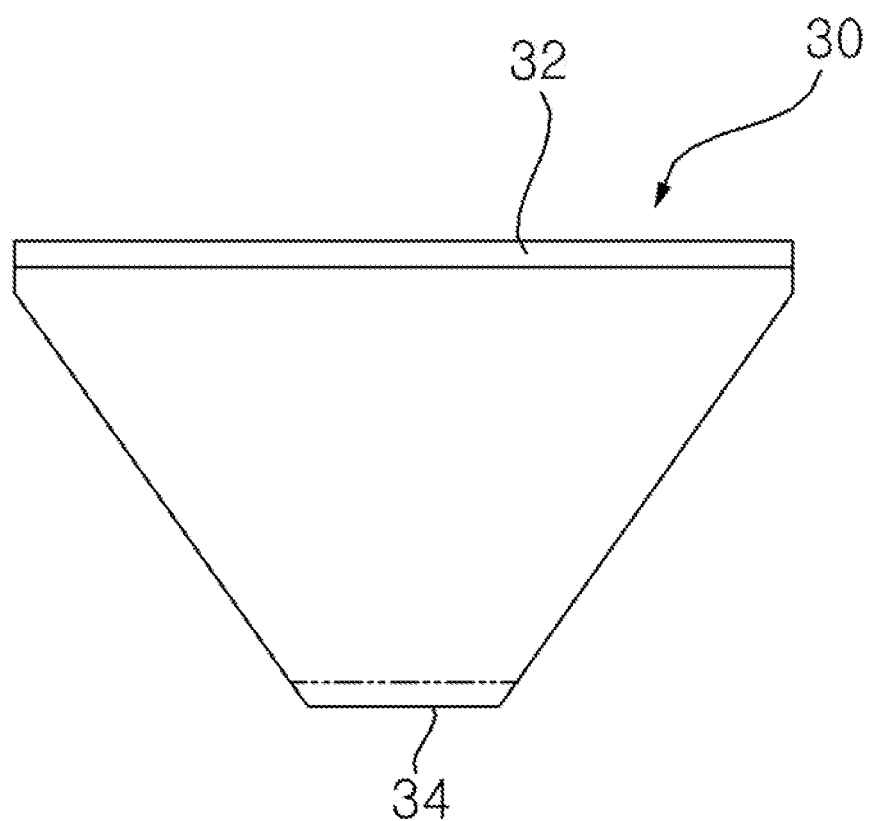
FIG. 4 is a view illustrating a tether of the airbag apparatus according to the first exemplary embodiment of the present invention.

FIG. 4 is a view illustrating a tether of the airbag apparatus according to the first exemplary embodiment of the present invention.

Referring to FIGS. 3 and 4, a sub-cushion deployment timing adjusting means, which adjusts a point of time at which the sub-cushion 20 protrudes toward the front surface of the main cushion 10, is coupled to the main cushion 10. In the present exemplary embodiment, the sub-cushion deployment timing adjusting means is configured as a single tether 30.

The tether 30 is disposed in the main cushion 10 so that one end 32 of the tether 30 is coupled to the sub-cushion 20, and the other end 34 of the tether 30 is coupled to the main cushion 10. In more detail, the one end 32 of the tether 30 is coupled to the second panel 24 of the sub-cushion 20 by sewing, and the other end 34 of the tether 30 is coupled to the main panel 12 of the main cushion 10 by sewing. A tether coupling portion 12c, which is a portion to which the other end 34 of the tether 30 is coupled by sewing, is formed at the main panel 12.

The tether 30 has a length that may allow the tether 30 to be tightened while the sub-cushion 20 is inflated. Further, the other end 34 of the tether 30 is coupled to the main cushion 10 by sewing using a yarn that may be torn by expansive force of the sub-cushion 20. Therefore, when the tether 30 is tightened by expansive force of the sub-cushion 20 while the sub-cushion 20 is inflated by gas in the main cushion 10, the yarn, which couples the other end 34 of the tether 30 to the main cushion 10, is torn, such that the other end 34 of the tether 30 is separated from the main cushion 10 by expansive force of the sub-cushion 20. When the other end 34 of the tether 30 is separated from the main cushion 10 as described above, the sub-cushion 20 may protrude toward the front surface of the main cushion 10.

In the tether 30, a width of the one end 32 coupled to the sub-cushion 20 is wider than a width of the other end 34 coupled to the main cushion 10. Therefore, coupling strength of the one end 32 of the tether 30 is higher than coupling strength of the other end 34, and as a result, when the sub-cushion 20 is tightened by expansive force, the one end 32 coupled to the sub-cushion 20 is not separated from the sub-cushion 20, and the other end 34 coupled to the main cushion 10 may be easily separated from the main cushion 10.

Figure 5:
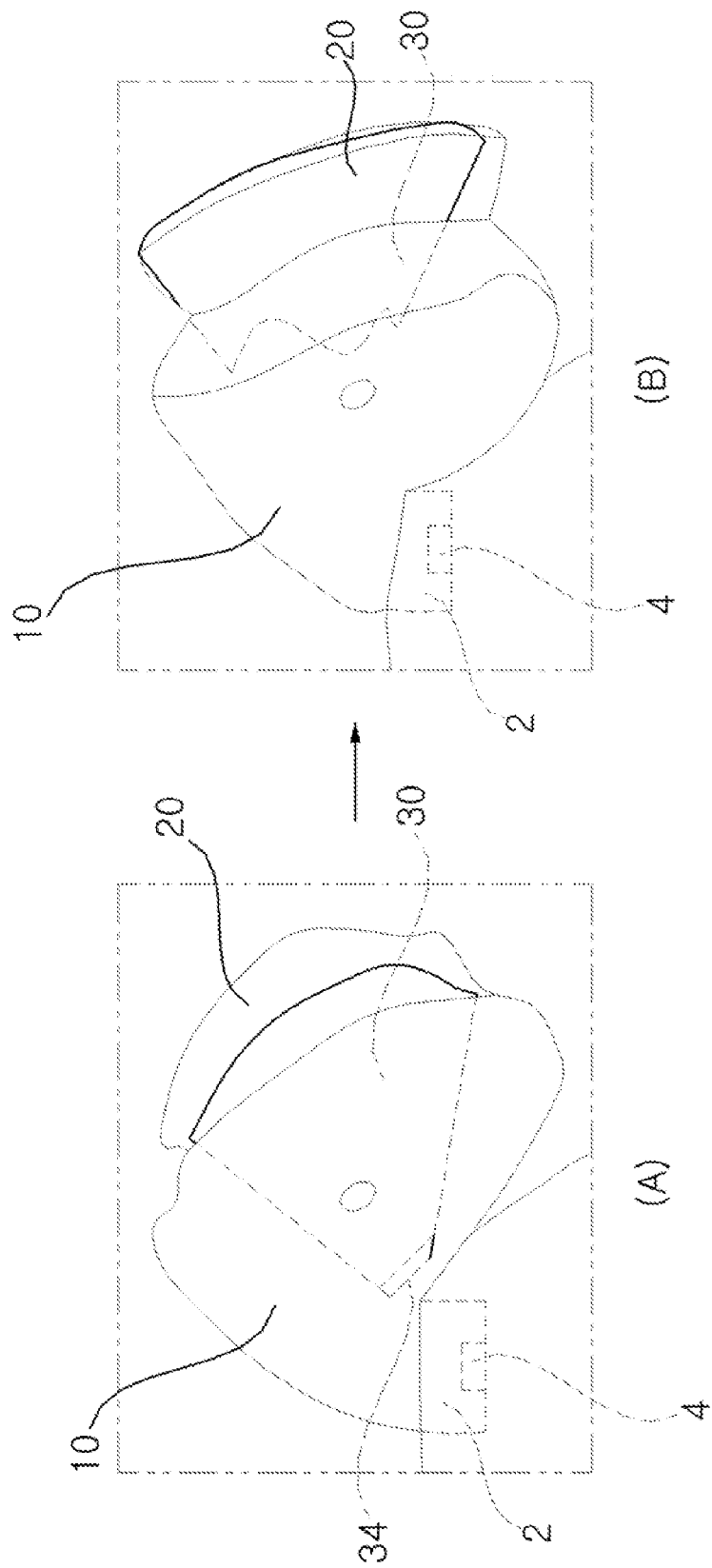
FIG. 5 is a view illustrating an operational sequence of the airbag apparatus according to the first exemplary embodiment of the present invention.

FIG. 5 is a view illustrating an operational sequence of the airbag apparatus according to the first exemplary embodiment of the present invention.

Referring to FIG. 5, the airbags 10 and 20 are folded and accommodated in an airbag housing 2, and at the time of an accident of the vehicle, the airbags 10 and 20 are inflated and deployed by gas generated by the inflator 4. As illustrated in FIG. 5A, the tether 30 is tightened by expansive force of the sub-cushion 20 while the airbags 10 and 20 are deployed.

Thereafter, after the main cushion 10 is fully inflated and the head and the chest of the occupant come into contact with the front surface of the main cushion 10, the other end 34 of the tether 30 is separated from the main cushion 10 by expansive force of the sub-cushion 20 as illustrated in FIG. 5B, such that a point of time at which the sub-cushion 20 protrudes toward the front surface of the main cushion 10 is adjusted. When the sub-cushion 20 protrudes toward the front surface of the main cushion 10 as described above, the head and the chest of the occupant, which are in contact with the front surface of the main cushion 10, are prevented by the sub-cushion 20 from sliding toward a lateral side.

Meanwhile, referring to FIG. 2, a slit 15 is further formed in the side panel 14 of the main cushion 10. It can be seen that a second strap 48 is inserted into the slit 15. That is, the second strap 48 is inserted into the slit 15, and penetrates one side surface of the main cushion 10. The second strap 43 is one of the configurations that adjust an amount of gas in the main cushion 10 which is discharged through the sub-vent hole 14b. A configuration, which adjusts an amount of gas in the main cushion 10 which is discharged through the sub-vent hole 14b, will be described below.

Figure 6:
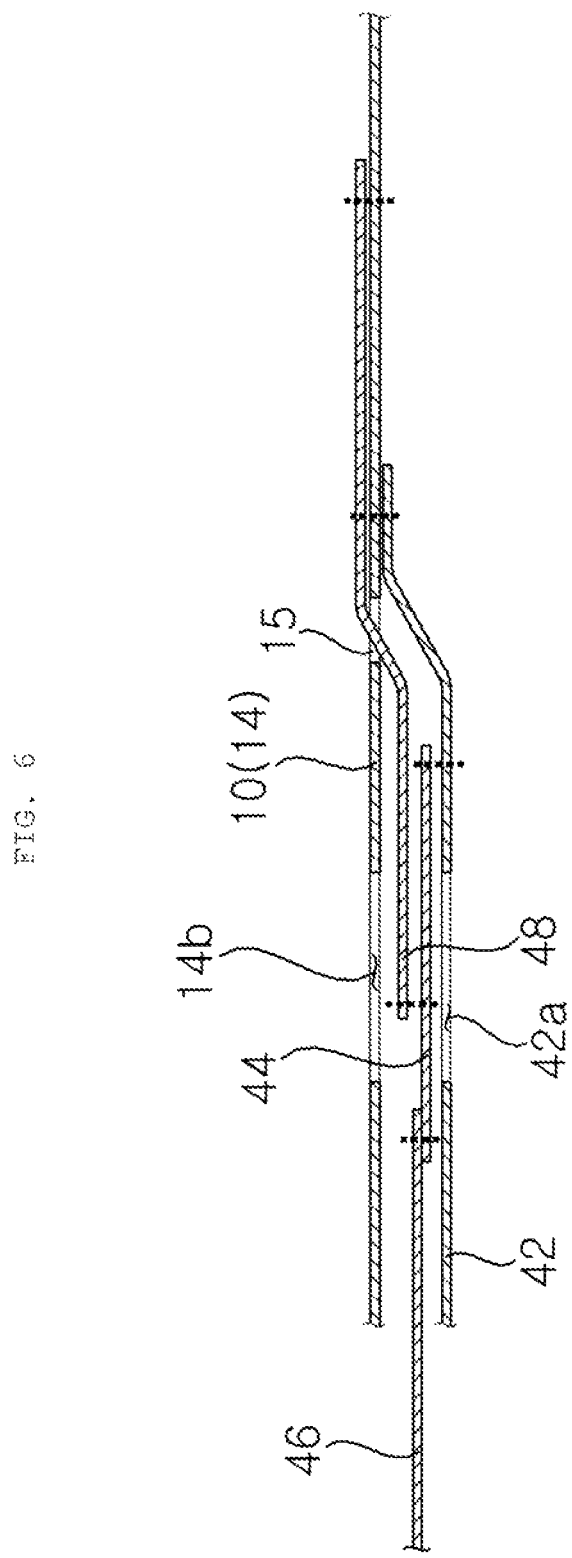
FIG. 6 is a cross-sectional view taken along line A-A illustrated in FIG. 2.
Figure 7:
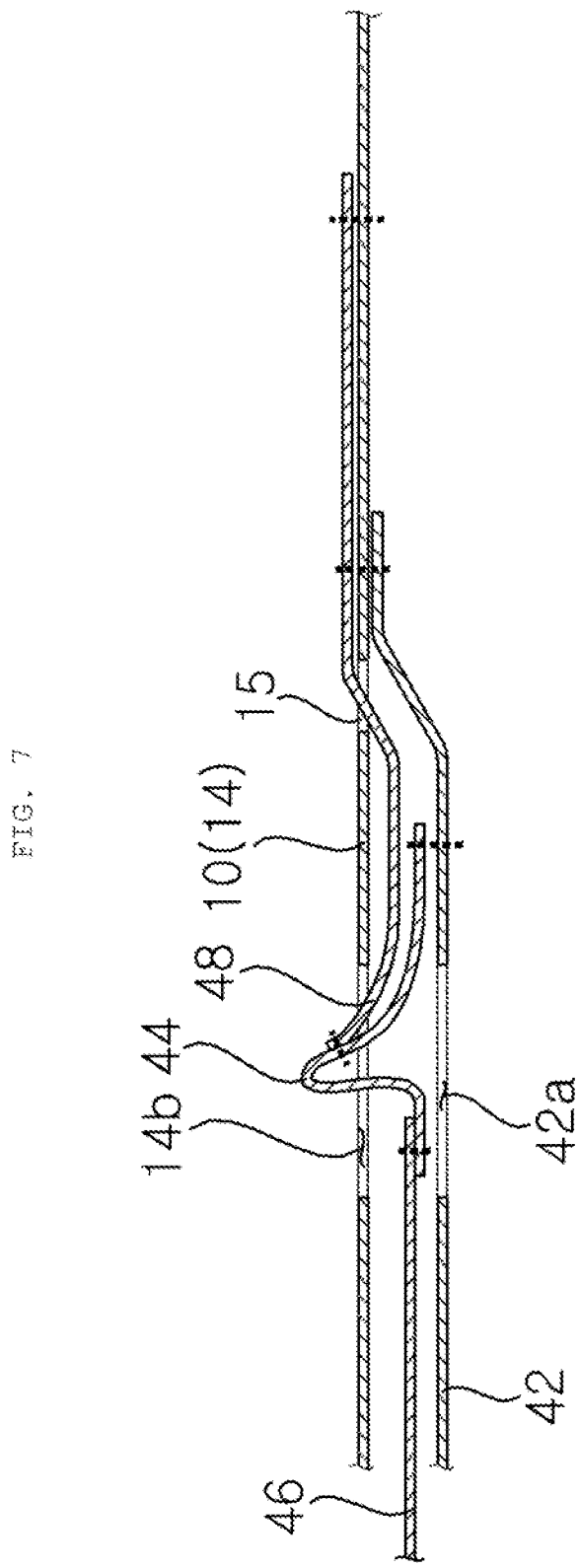
FIG. 7 is an operational view of FIG. 6.
Figure 8:
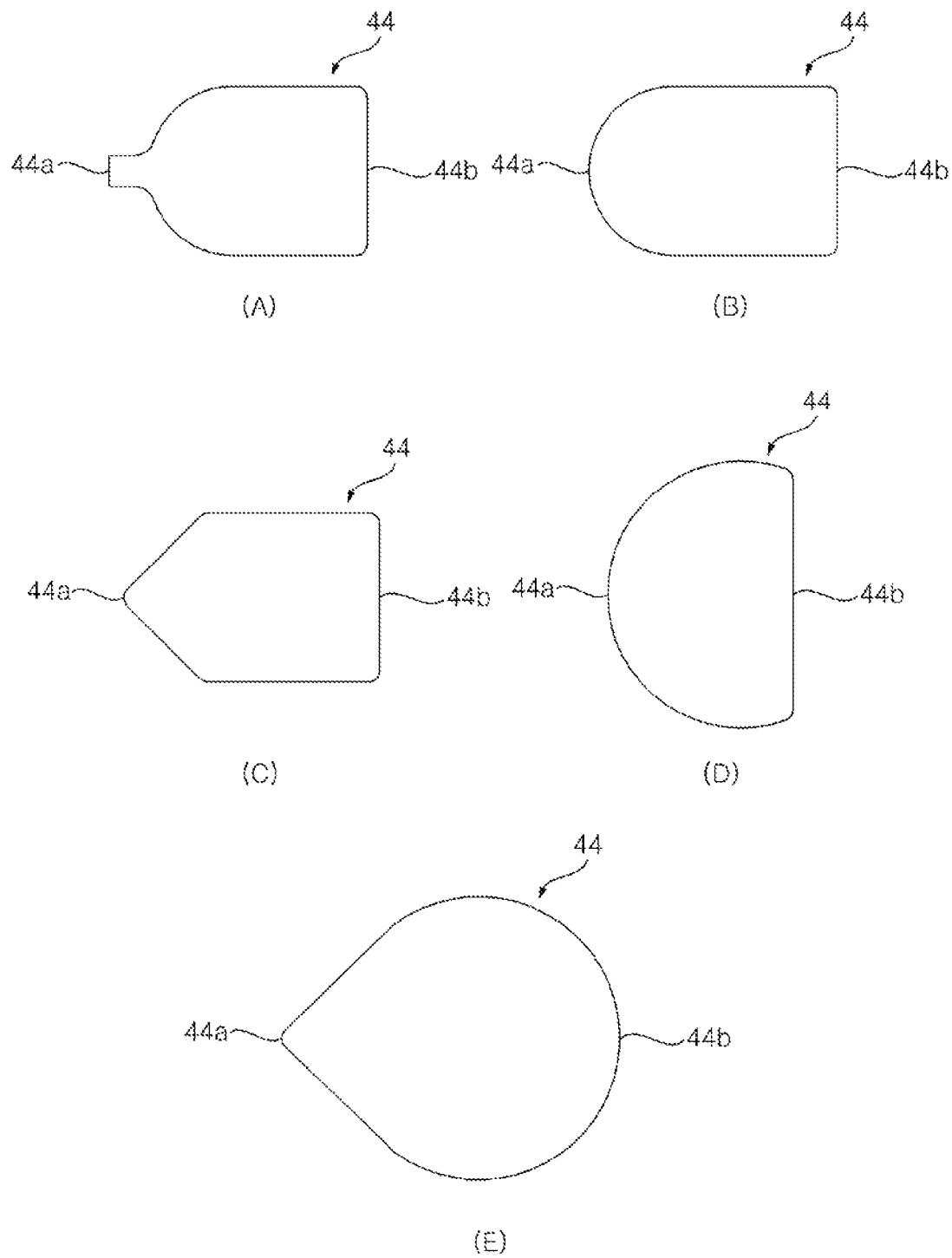
FIG. 8 is a view illustrating various shapes of a vent cover illustrated in FIGS. 6 and 7.

FIG. 6 is a cross-sectional view taken along line A-A illustrated in FIG. 2, FIG. 7 is an operational view of FIG. 6, and FIG. 8 is a view illustrating various shapes of a vent cover illustrated in FIGS. 6 and 7.

Referring to FIGS. 2, and 6 to 8, the airbag apparatus according to the first exemplary embodiment of the present invention further includes a guide panel 42 which is coupled to an inner surface of the main cushion 10, a vent cover 44 which is disposed between the main cushion 10 and the guide panel 42, a first strap 46 which has one end coupled to the vent cover 44 and the other end coupled to the main cushion 10, and the second strap 48 which has one end coupled to the vent cover 44 and the other end coupled to the main cushion.

The guide panel 42 is coupled to a portion of the side panel 14 of the main cushion 10 where the sub-vent hole 14b is formed. A communicating hole 42a, which is in communication with the sub-vent hole 14b, is formed in the guide panel 42.

The vent cover 44 is disposed between the main cushion 10 and the guide panel 42, and shields the sub-vent hole 14b and the communicating hole 42a. One end of the vent cover 44 is coupled to the side panel 14, and the other end of the vent cover 44 is coupled to the first strap 46.

One end of the first strap 46 is coupled to the vent cover 44, and the other end of the first strap 46 is coupled to the main cushion 10, thereby holding the vent cover 44 so that the vent cover 44 may shield the sub-vent hole 14b and the communicating hole 42a. The other end of the first strap 46 may be coupled to the side panel 14 of the main cushion 10, or may be coupled to the main panel 12. The other end of the first strap 46 is coupled to the main cushion 10 by the yarn that may be torn by expansive force of the main cushion 10. Therefore, the first strap 46 may be tightened by expansive force of the main cushion 10, such that the other end of the first strap 46 may be separated from the main cushion 10. When the other end of the first strap 46 is separated by expansive force of the main cushion 10 as described above, the vent cover 44 protrudes to the outside of the main cushion 10 through the sub-vent hole 14b by gas pressure in the main cushion 10, and opens the sub-vent hole 14b and the communicating hole 42a, such that gas in the main cushion 10 sequentially passes through the communicating hole 42a and the sub-vent hole 14b, and then may be discharged to the outside of the main cushion 10.

One end of the second strap 48 is coupled to the vent cover 44, and the other end of the second strap 48 is coupled to the main cushion 10. The one end of the second strap 48 is coupled to a central portion between one end and the other end of the vent cover 44, and the other end of the second strap 48 is coupled to a coupling portion between the main panel 12 and the side panel 14. The other end of the second strap 48 may be coupled when the side panel 14 is coupled to the main panel 12.

The second strap 48 is tightened by expansive force of the main cushion 10 and pulls the vent cover 44 when the other end of the first strap 46 is separated from the main cushion 10. Therefore, the vent cover 44 easily protrudes to the outside of the main cushion 10 through the sub-vent hole 14b while being moved forward along the second strap 48, thereby opening the sub-vent hole 14b and the communicating hole 42a. If there is no second strap 48, the vent cover 44 protrudes through the sub-vent hole 14*b* only by gas pressure in the main cushion 10 which is discharged through the communicating hole 42*a*, and as a result, there is concern that the vent cover 44 will be caught by the main cushion 10 and will not fully protrude while the vent cover 44 protrudes through the sub-vent hole 14*b*. However, in the present exemplary embodiment, since the second strap 48 pulls the vent cover 44 forward, the vent cover 44 may easily protrude to the outside of the main cushion 10 through the sub-vent hole 14*b*.

In order to allow the vent cover 44 to be able to easily protrude to the outside of the main cushion 10 through the sub-vent hole 14*b*, a width of one end 44*a* of the vent cover 44 to which the first strap 46 is coupled may be narrower than a width of the other end 44*b* to which the second strap 48 is coupled. FIG. 8 illustrates various shapes of the vent cover 44 in a case in which the one end 44*a* of the vent cover 44 is formed to be narrower in width than the other end 44*b*.

Meanwhile, the aforementioned airbag apparatus according to the first exemplary embodiment of the present invention is an airbag apparatus that is installed in a low-priced vehicle. In a high-priced vehicle, a tether remove unit 60 to be described below is further installed. An airbag apparatus according to a second exemplary embodiment of the present invention, which includes the tether remove unit 60, will be described below.

Figure 9:
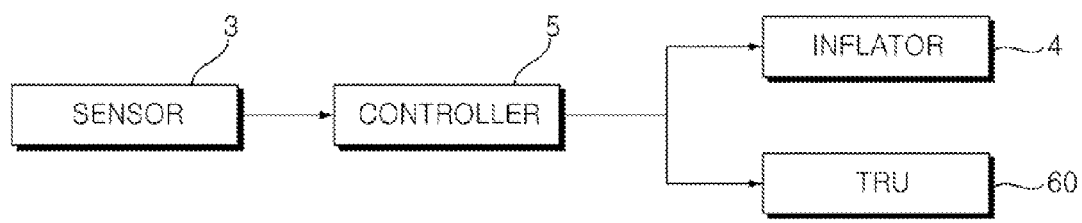
FIG. 9 is a control block diagram illustrating an airbag apparatus according to a second exemplary embodiment of the present invention.

FIG. 9 is a control block diagram illustrating the airbag apparatus according to the second exemplary embodiment of the present invention. Hereinafter, like reference numerals refer to constituent elements identical to those of the aforementioned first exemplary embodiment, a description thereof will be omitted, and only the differences between the exemplary embodiments will be described.

Referring to FIG. 9, the airbag apparatus according to the second exemplary embodiment of the present invention further includes the tether remove unit (TRU) 60.

The aforementioned first exemplary embodiment controls the airbags 10 and 20 by using the configuration, in which the tether remove unit 60 is omitted from FIG. 9. That is, in the first exemplary embodiment, at the time of an accident of the vehicle, a sensor 3 senses a collision of the vehicle, and transmits a collision signal to a controller 5, and the controller 5 controls the inflator 4 to generate gas by using the collision signal transmitted from the sensor 3, such that the airbags 10 and 20 are inflated by gas generated by the inflator 4.

However, when compared to the aforementioned first exemplary embodiment, the present second exemplary embodiment further includes the tether remove unit 60. The tether remove unit 60 is one of the configurations that adjust a point of time at which the sub-cushion 20 protrudes toward the front surface of the main cushion 10. In the aforementioned first exemplary embodiment, only the tether 30 is provided as a configuration that adjusts a point of time at which the sub-cushion 20 protrudes toward the front surface of the main cushion 10, but the present second exemplary embodiment further includes the tether remove unit 60 in addition to the tether 30 to be described below, thereby adjusting a point of time at which the sub-cushion 20 protrudes toward the front surface of the main cushion 10.

Figure 10:
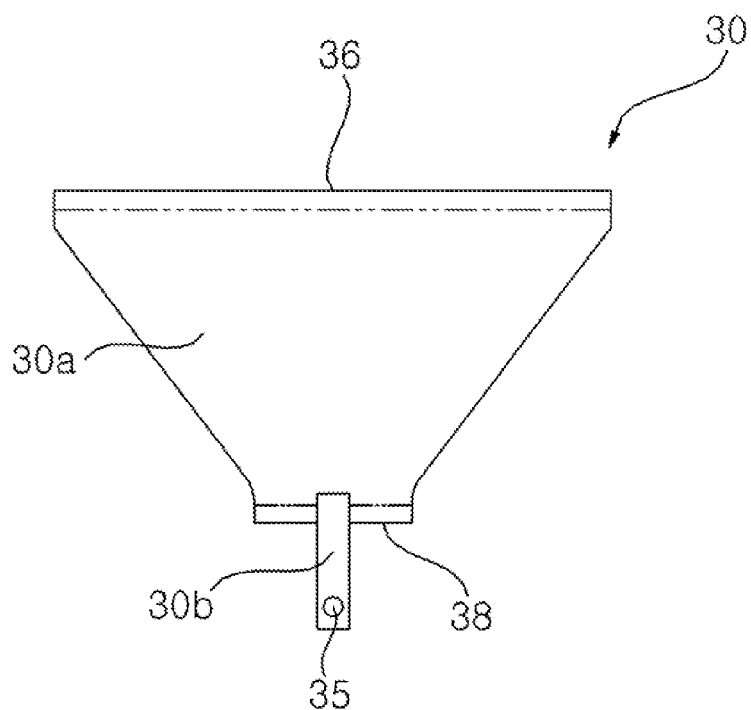
FIG. 10 is a view illustrating a tether of the airbag apparatus according to the second exemplary embodiment of the present invention.

FIG. 10 is a view illustrating the tether of the airbag apparatus according to the second exemplary embodiment of the present invention.

Referring to FIG. 10, it can be seen that the tether 30 of the airbag apparatus according to the second exemplary embodiment of the present invention differs from the tether of the airbag apparatus according to the aforementioned first exemplary embodiment. That is, a length of the tether 30 of the airbag apparatus according to the second exemplary embodiment of the present invention is longer than a length of the tether 30 in the aforementioned first exemplary embodiment. The tether 30 may include a first tether 30*a*, and a second tether 30*b*. As the first tether 30*a*, a tether identical to the tether 30 in the aforementioned first exemplary embodiment may be used. However, in the aforementioned first exemplary embodiment, the tether 30 has one end 32 coupled to the sub-cushion 20 and the other end 34 coupled to the main cushion 10, but in the present second exemplary embodiment, the first tether 30*a* has one end 36 coupled to the sub-cushion 20 and the other end 38 coupled to the second tether 30*b*. Further, the second tether 30*b* is coupled to the tether remove unit 60 instead of being coupled to the main cushion 10. That is, one end of the second tether 30 is coupled to the other end 38 of the first tether 30*a*, and the other end of the second tether 30 is coupled to the tether remove unit 60.

A rivet hole 35 to which the tether remove unit 60 is coupled is formed at the other end of the second tether 30*b*. The other end of the second tether 30*b* may be coupled to the tether remove unit 60 by inserting a rivet (not illustrated) into the rivet hole 35.

A width of the one end 36 of the first tether 30*a*, which is coupled to the sub-cushion 20, is wider than a width of the other end 38 that is coupled to the second tether 30*b*, and a width of the second tether 30*b* is narrower than a width of the first tether 30*a*.

The tether remove unit 60 may have a similar configuration to the inflator 4, but may have a smaller size than the inflator 4. That is, the inside of the tether remove unit 60 is filled with a gas generating medium that generates gas, and the gas generating medium generates gas while being exploded by a control signal of the controller 5, such that the rivet may be separated from the tether remove unit 60 by explosive gas pressure in the tether remove unit 60, and the second tether 30*b* may be separated from the tether remove unit 60.

The tether remove unit 60 may be coupled to the airbag housing 2, and may be disposed in the main cushion 10.

Figure 11:
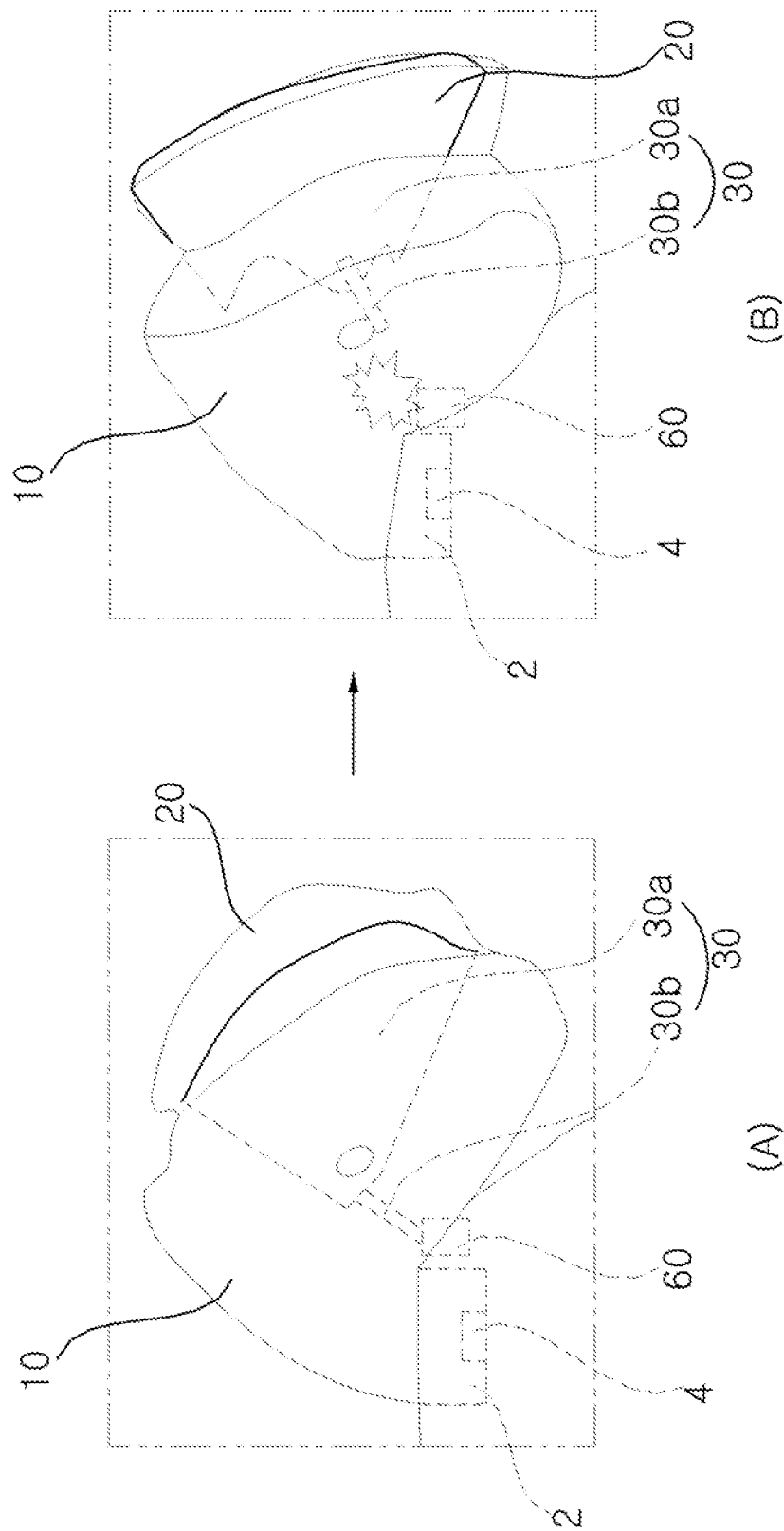
FIG. 11 is a view illustrating an operational sequence of the airbag apparatus according to the second exemplary embodiment of the present invention.

FIG. 11 is a view illustrating an operational sequence of the airbag apparatus according to the second exemplary embodiment of the present invention.

Referring to FIG. 11, the airbags 10 and 20 are folded and accommodated in the airbag housing 2, and at the time of an accident of the vehicle, the airbags 10 and 20 are inflated and deployed by gas generated by the inflator 4. As illustrated in FIG. 11A, the tether 30 is tightened by expansive force of the sub-cushion 20 while the airbags 10 and 20 are deployed.

Thereafter, after the main cushion 10 is fully inflated and the head and the chest of the occupant come into contact with the front surface of the main cushion 10, the tether remove unit 60 is operated by a control signal of the controller 5 and separated from the other end of the tether 30 as illustrated in FIG. 11B, such that a point of time at which the sub-cushion 20 protrudes toward the front surface of the main cushion 10 is adjusted. When the sub-cushion 20 protrudes toward the front surface of the main cushion 10 as described above, the head and the cheat of the occupant, which are in contact with the front surface of the main cushion 10, are prevented by the sub-cushion 20 from sliding toward a lateral side.

Figure 12:
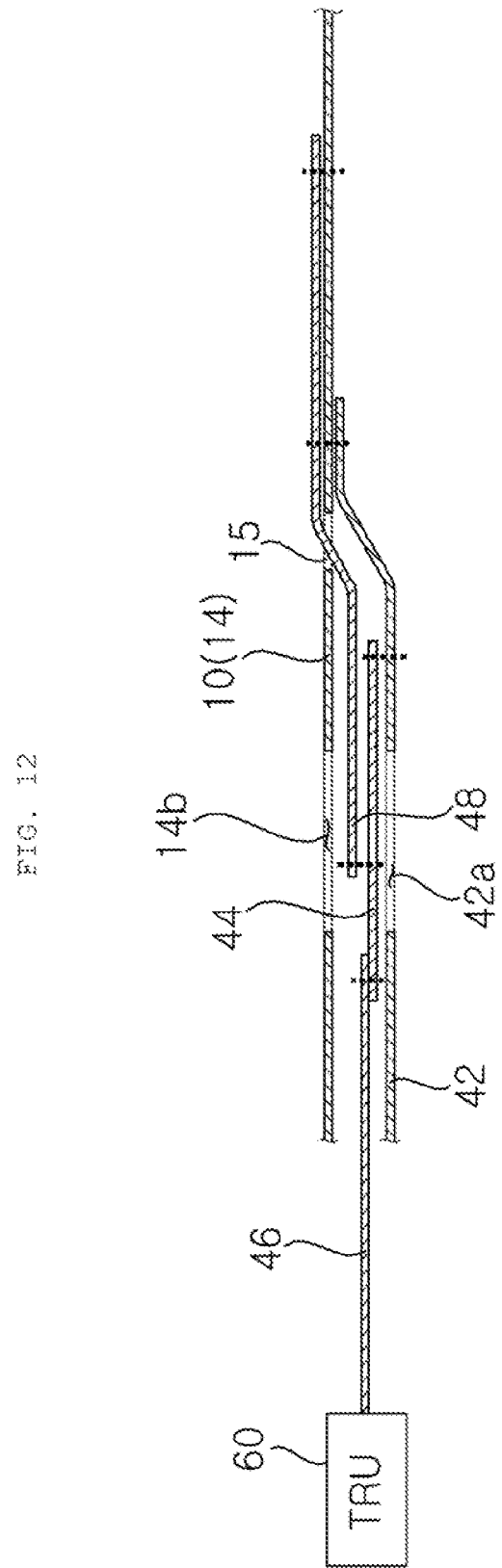
FIG. 12 is a cross-sectional view illustrating a guide panel, a vent cover, a first strap, and a second strap of the airbag apparatus according to the second exemplary embodiment of the present invention.
Figure 13:
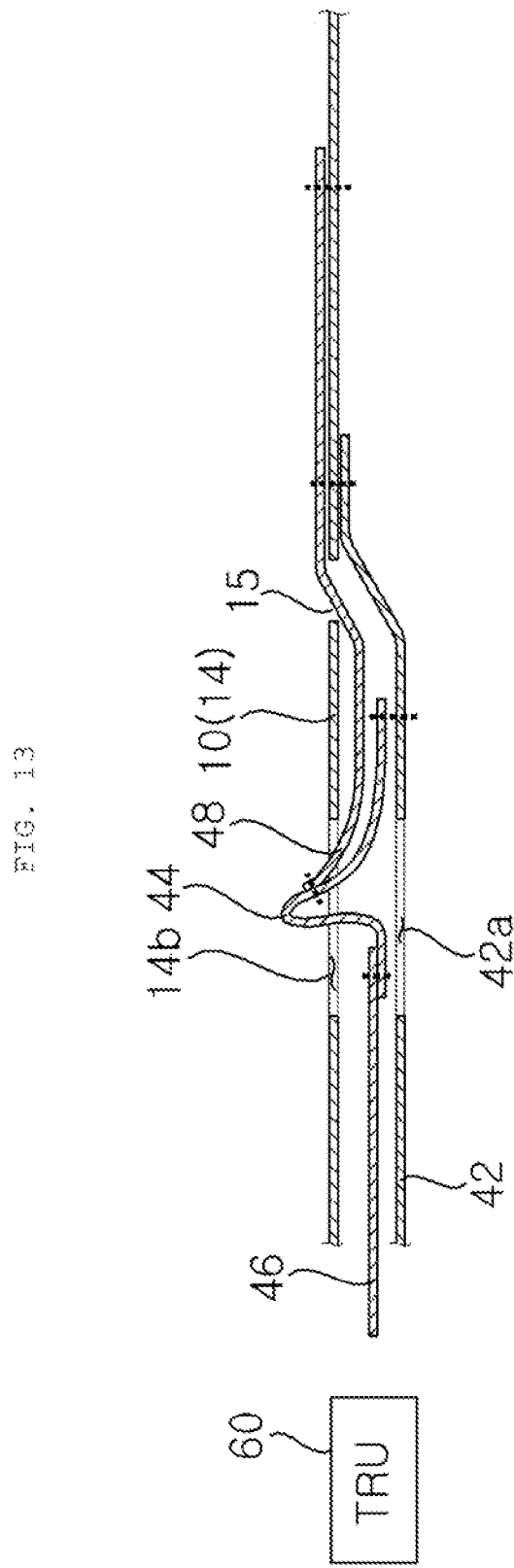
FIG. 13 is an operational view of FIG. 12.

FIG. 12 is a cross-sectional view illustrating a guide panel, a vent cover, a first strap, and a second strap of the airbag apparatus according to the second exemplary embodiment of the present invention, and FIG. 13 is an operational view of FIG. 12.

Meanwhile, in the aforementioned first exemplary embodiment, the first strap 46 has one end coupled to the vent cover 44 and the other end coupled to the main cushion 10, but in the present second exemplary embodiment, the first strap 46 has one end coupled to the vent cover 44 and the other end coupled to the tether remove unit 60.

Therefore, when the first strap 46 is separated from the tether remove unit 60 by a control signal of the controller 5, the vent cover 44 is pulled by the tightened second strap 48, and protrudes to the outside of the main cushion 10 through the sub-vent hole 14b, by gas pressure in the main cushion 10 which is discharged through the communicating hole 42a, while being moved forward along the second strap 48, thereby opening the sub-vent hole 14b and the communicating hole 42a.

Figure 14:
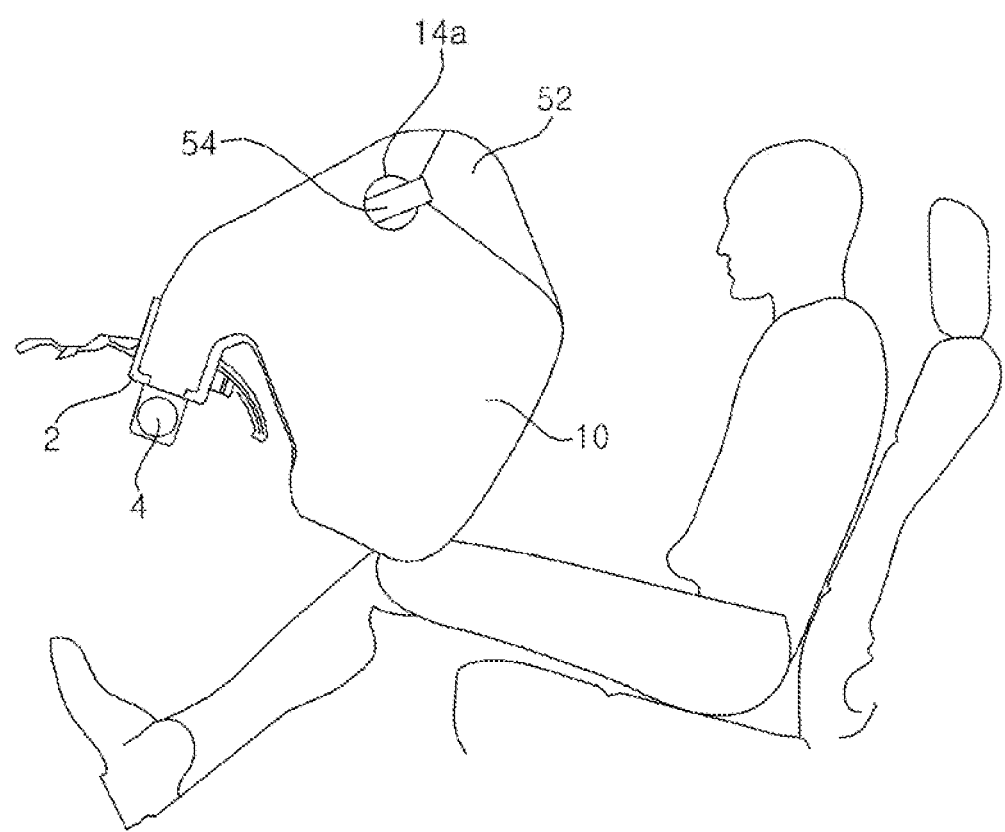
FIG. 14 is a side view illustrating an airbag apparatus according to a third exemplary embodiment of the present invention.
Figure 15:
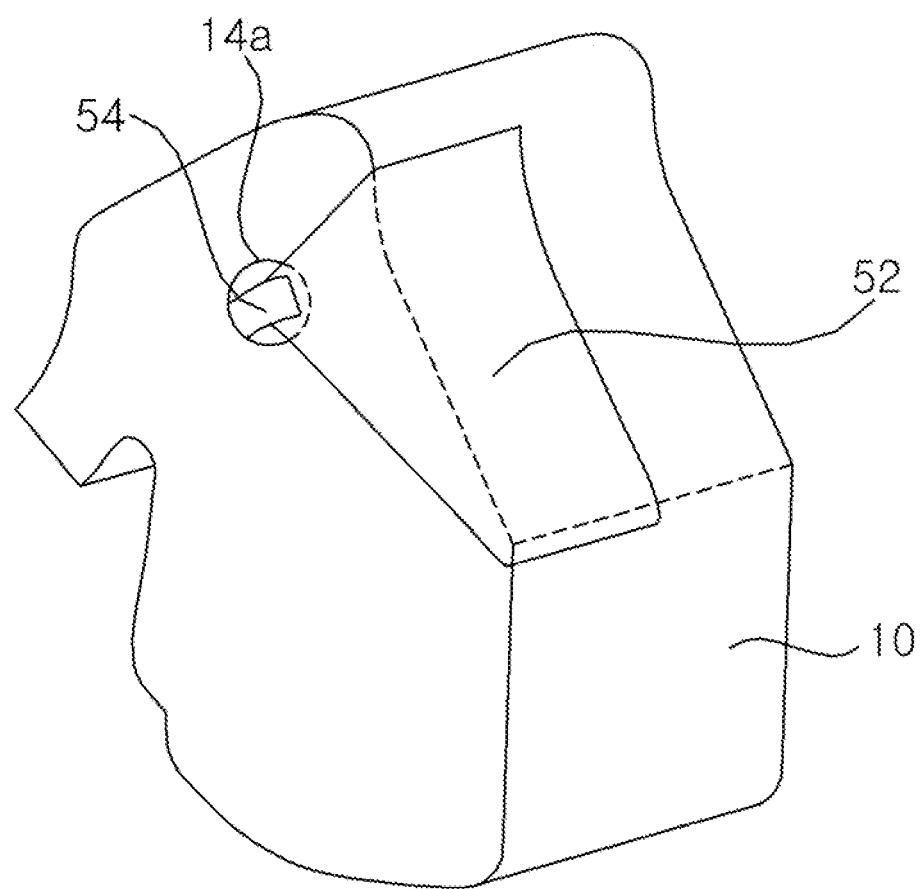
FIG. 15 is a perspective view illustrating the airbag apparatus according to the third exemplary embodiment of the present invention.
Figure 16:
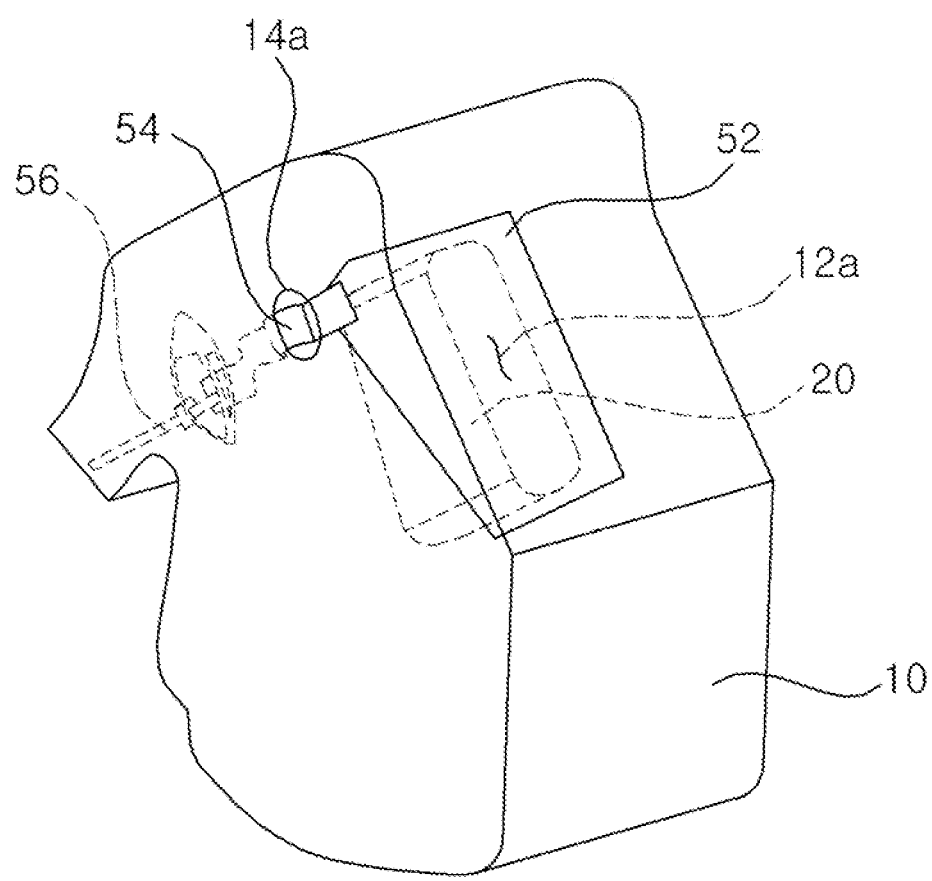
FIG. 16 is a view illustrating an internal configuration in FIG. 15.
Figure 17:
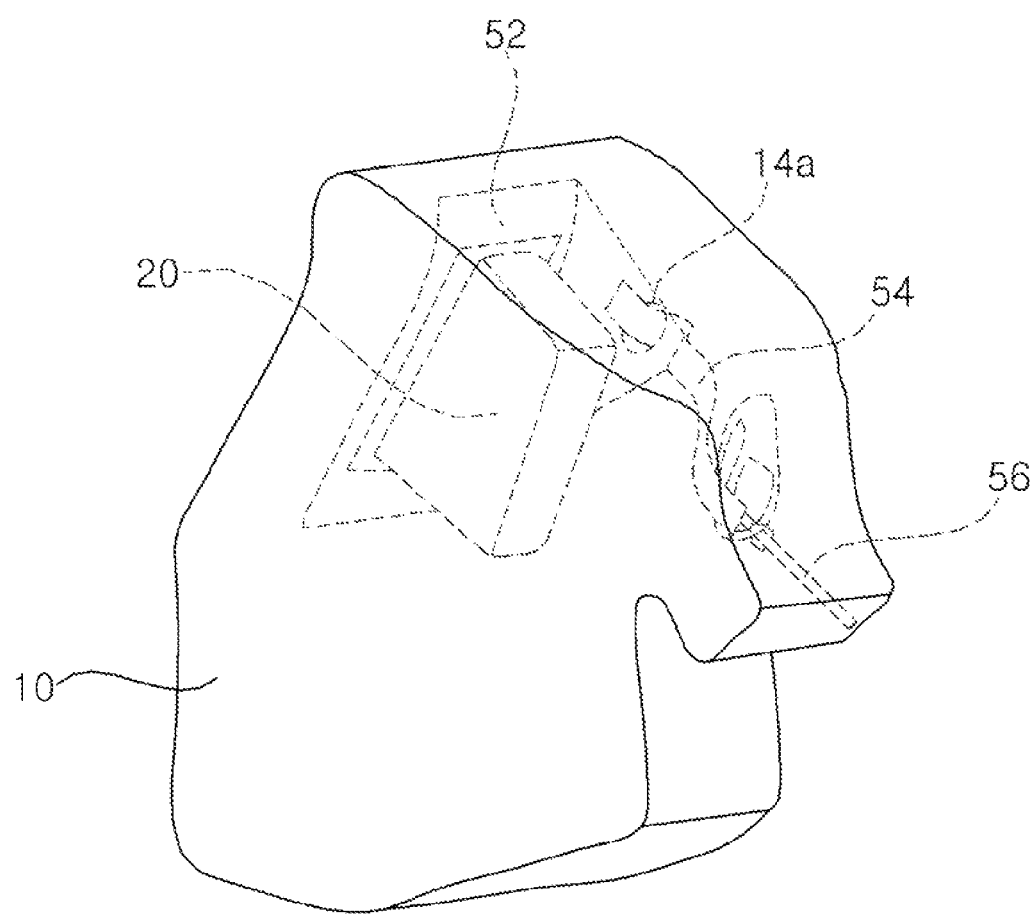
FIG. 17 is a rear perspective view of FIG. 16.

FIG. 14 is a side view illustrating an airbag apparatus according to a third exemplary embodiment of the present invention, FIG. 15 is a perspective view illustrating the airbag apparatus according to the third exemplary embodiment of the present invention, FIG. 16 is a view illustrating an internal configuration in FIG. 15, and FIG. 17 is a rear perspective view of FIG. 16. Hereinafter, like reference numerals refer to constituent elements identical to those of the aforementioned first exemplary embodiment, a description thereof will foe omitted, and only the differences between the exemplary embodiments will be described.

Referring to FIGS. 14 to 17, it can be seen that the airbag apparatus according to the third exemplary embodiment of the present invention differs from the airbag apparatus according to the aforementioned first exemplary embodiment. That is, in the aforementioned first exemplary embodiment, the sub-cushion deployment timing adjusting means is configured as the tether 30, but in the present third exemplary embodiment, the sub-cushion deployment timing adjusting means includes a cover 52, and a first tether 54.

One end of the cover 52 is coupled to an outer surface of the main cushion 10, and the cover 52 covers a portion of the sub-cushion 20 which protrudes toward the front surface of the main cushion 10. While the present exemplary embodiment exemplifies an example in which the one end of the cover 52 is coupled to the front surface of the main cushion 10 and the cover 52 covers a portion of the sub-cushion 20 which protrudes toward the front surface of the main cushion 10, the one end of the cover 52 need not be necessarily coupled to the front surface of the main cushion 10 as long as the one end of the cover 52 is coupled to the outer surface of the main cushion 10.

The first tether 54 penetrates the side panel 14 that is one side surface of the main cushion 10. In the present exemplary embodiment, the first tether 54 is inserted into the main vent hole 14a, and penetrates the one side surface of the main cushion 10.

One end of the first tether 54 is disposed outside the main cushion 10 and coupled to the other end of the cover 52. In the case of a low-priced vehicle without the tether remove unit 60, the other end of the first tether 54 is disposed in the main cushion 10 and coupled to the inner surface of the main cushion 10. Of course, in the case of a high-priced vehicle having the tether remove unit 60, the other end of the first tether 54 is coupled to the tether remove unit 60 instead of being coupled to the inner surface of the main cushion 10.

In a case in which the other end of the first tether 54 is coupled to the inner surface of the main cushion 10, the other end of the first tether 54 is separated from the main cushion 10 by expansive force of the sub-cushion 20. When the other end of the first tether 54 is separated from, the main cushion 10, the sub-cushion 20 protrudes toward the front surface of the main cushion 10.

In a case in which the other end of the first tether 54 is coupled to the tether remove unit 60, the tether remove unit 60 is separated from the other end of the first tether 54 by a control signal of the controller 5. When the other end of the first tether 54 is separated, from the tether remove unit 60, the sub-cushion 20 protrudes toward the front surface of the main cushion 10.

Hereinafter, a configuration limited to the configuration in which the other end of the first tether 54 is coupled to the tether remove unit 60 will be described.

Figure 18:
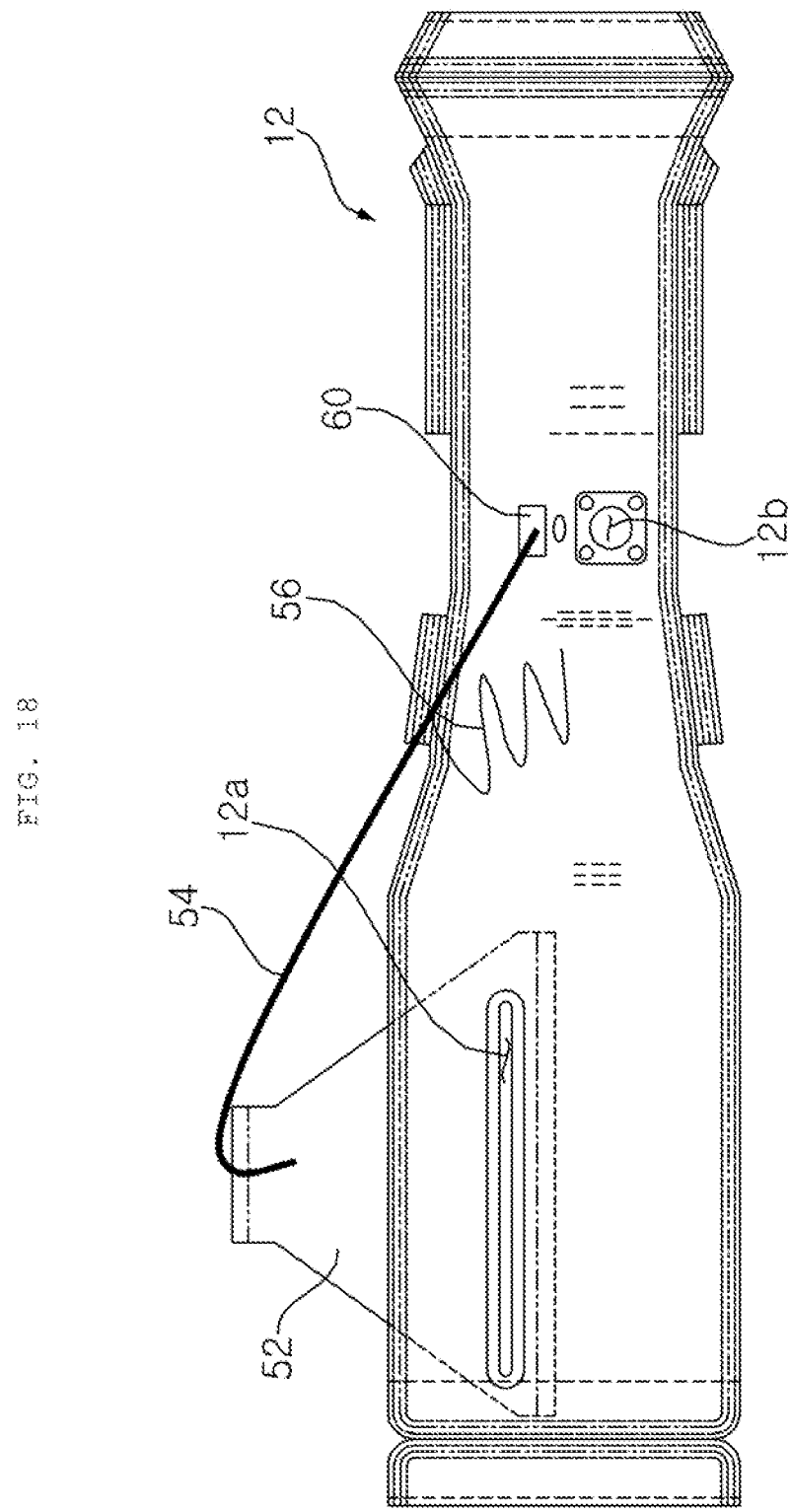
FIG. 18 is a view illustrating a state in which a main panel of a main cushion illustrated in FIG. 15 is spread out before being manufactured as an airbag.
Figure 19:
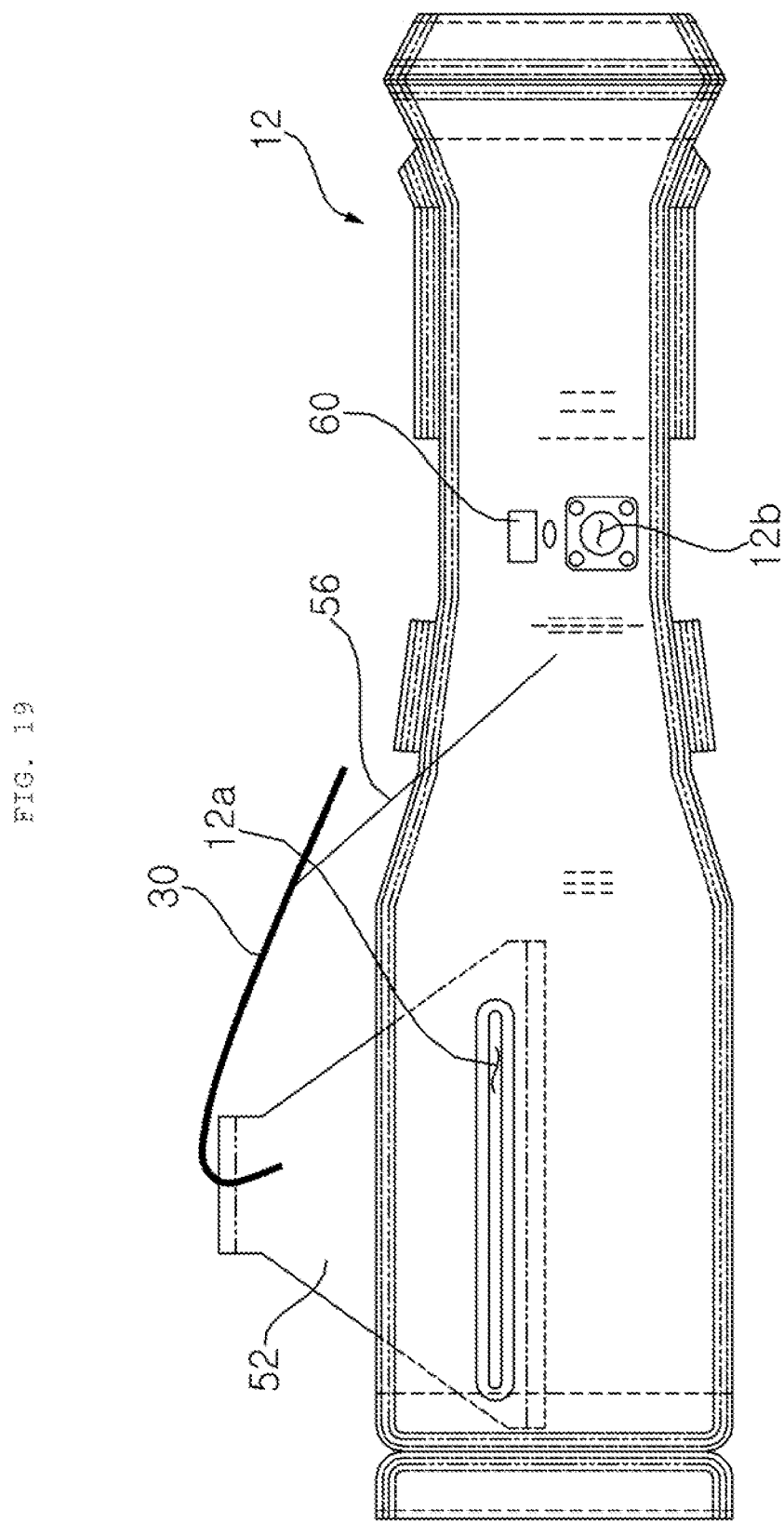
FIG. 19 is an operational view of FIG. 18.

FIG. 18 is a view illustrating a state in which the main panel of the main cushion illustrated in FIG. 15 is spread out before being manufactured as an airbag, and FIG. 19 is an operational view of FIG. 18.

Referring to FIGS. 18 and 19, a second tether 56 is further coupled to the main panel 12 of the main cushion 10. One end of the second tether 56 is coupled to the first tether 54, and the other end of the second tether 56 is coupled to the main panel 12 of the main cushion 10 and disposed in the main cushion 10. When the first tether 54 is separated from the tether remove unit 60, the second tether 56 restricts the first tether 54 that has been separated from the main cushion 10, and prevents the first tether 54 from escaping to the outside of the main cushion 10 through the main vent hole 14a.

That is, since the cover 52 is disposed at the outer surface of the main cushion 10, and a part of the first tether 54 is disposed at the outer surface of the main cushion 10, there is concern that when the other end of the first tether 54 is separated, from, the tether remove unit 60, the other end of the first tether 54 will escape to the outside of the main cushion 10 through the main vent hole 14a and dangle. Therefore, the second tether 56 restricts the first tether 54, and prevents the other end of the first tether 54 from escaping to the outside of the main cushion 10 through the main vent hole 14a.

The second tether 56 may be formed to have a length that may allow the sub-cushion 20 to protrude toward the front surface of the main cushion 10 when the first tether 54 is separated from the tether remove unit 60, and may prevent the other end of the first tether 54 from escaping to the outside of the main cushion 10 through the main vent hole 14a.

Figure 20:
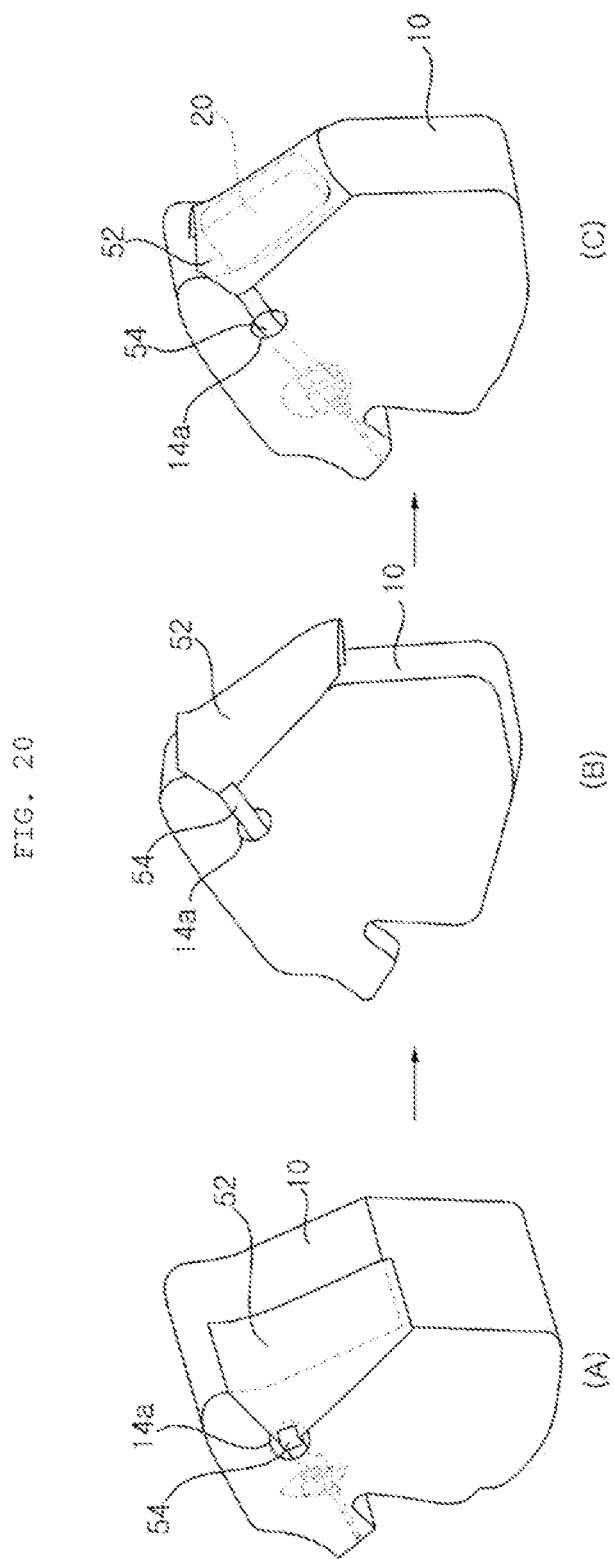
FIG. 20 is a view illustrating an operational sequence of the airbag apparatus according to the third exemplary embodiment of the present invention.
Figure 21:
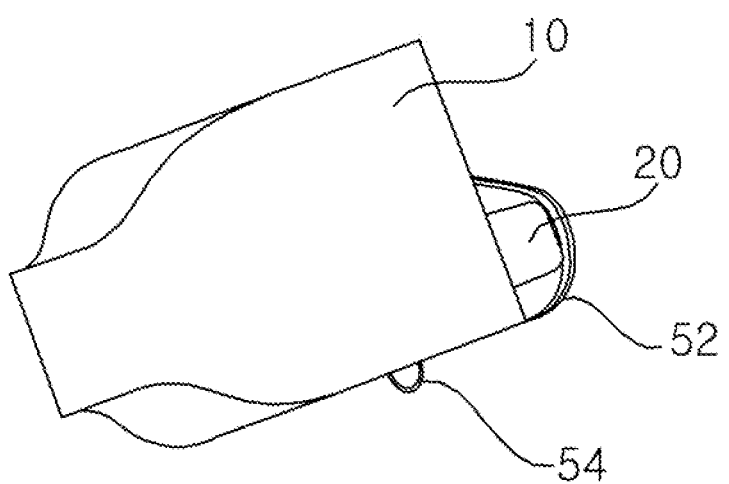
FIG. 21 is a view when viewing FIG. 20C from the top side.

FIG. 20 is a view illustrating an operational sequence of the airbag apparatus according to the third exemplary embodiment of the present invention, and FIG. 21 is a view when viewing FIG. 20C from the top side.

Referring to FIGS. 20 and 21, a state illustrated in FIG. 20A is maintained, before the main cushion 10 is fully inflated and the head and the chest of the occupant come into contact with the front surface of the main cushion 10. In this state, since the tether remove unit 60 holds the other end of the first tether 54, the cover 52 is in close contact with the front surface of the main cushion 10 so as to prevent the sub-cushion 20 from protruding toward the front surface of the main cushion 10. Therefore, the head and the chest of the occupant may safely come into contact with the flat front surface of the main cushion 10.

Thereafter, after the head of the occupant comes into contact with the front surface of the main cushion 10, the tether remove unit 60 is separated from the first tether 54 by a control signal of the controller 5. When the first tether 54 is separated from the tether remove unit 60 as described above, the cover 52 and the first tether 54 are loosened as illustrated in FIG. 20B, and as a result, the sub-cushion 20 is inflated by gas pressure in the main cushion 10 and begins to protrude toward the front surface of the main cushion 10.

Thereafter, as illustrated in FIGS. 20C and 21, the sub-cushion 20 is fully inflated by gas pressure in the main cushion 10, and protrudes toward the front surface of the main cushion 10. Therefore, the head and the chest of the occupant, which are in contact with the front surface of the main cushion 10, are prevented, by the sub-cushion 20 from sliding toward a lateral side.

As described above, according to the airbag apparatus according to the exemplary embodiments of the present invention, at the time of an accident of the vehicle, the sub-cushion 20 protrudes toward the front side of the main cushion 10 to prevent the head of the occupant from sliding toward a lateral side, thereby preventing the head of the occupant, which is in contact with the main cushion 10, from sliding toward a lateral side even though the vehicle collides with an object obliquely with respect to a direction in which the vehicle travels.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. An airbag apparatus comprising:
a main cushion which is inflated when gas flows into the main cushion to be deployed forward toward an occupant;
a sub-cushion which is disposed in the main cushion and inflated by gas pressure in the main cushion to protrude toward a front surface of the main cushion; and
a sub-cushion deployment timing adjusting means which is coupled to the main cushion, and adjusts a point of time at which the sub-cushion protrudes toward the front surface of the main cushion,
wherein a cut-out hole is formed in the front surface of the main cushion at a position that is biased toward one side, and the sub-cushion protrudes toward the front surface of the main cushion through the cut-out hole,
wherein the sub-cushion shields the cut-out hole and is coupled to the main cushion,
wherein the sub-cushion includes:
a first panel which has one side that is coupled to the main cushion along a circumference of the cut-out hole, and the other side that is opened; and
a second panel which shields the opened other side of the first panel and is coupled to the first panel.

2. An airbag apparatus comprising:
a main cushion which is inflated when gas flows into the main cushion to be deployed forward toward an occupant;
a sub-cushion which is disposed in the main cushion and inflated by gas pressure in the main cushion to protrude toward a front surface of the main cushion; and
a sub-cushion deployment timing adjusting means which is coupled to the main cushion, and adjusts a point of time at which the sub-cushion protrudes toward the front surface of the main cushion,
wherein the sub-cushion deployment timing adjusting means includes:
a tether which is disposed in the main cushion and has one end coupled to the sub-cushion; and
a tether remove unit which is disposed in the main cushion to be coupled to the other end of the tether, and separated from the tether by a control signal of a controller,
wherein the tether includes:
a first tether which has one end coupled to the sub-cushion; and
a second tether which has one end coupled to the other end of the first tether, and the other end coupled to the tether remove unit.

3. The airbag apparatus of claim 2, wherein a width of one end of the first tether, which is coupled to the sub-cushion, is wider than a width of the other end coupled to the second tether, and a width of the second tether is narrower than a width of the first tether.

4. The airbag apparatus of claim 2, wherein a rivet hole, which is coupled to the tether remove unit, is formed at the other end of the second tether.

5. An airbag apparatus comprising:
a main cushion which is inflated when gas flows into the main cushion to be deployed forward toward an occupant;
a sub-cushion which is disposed in the main cushion and inflated by gas pressure in the main cushion to protrude toward a front surface of the main cushion;
a sub-cushion deployment timing adjusting means which is coupled to the main cushion, and adjusts a point of time at which the sub-cushion protrudes toward the front surface of the main cushion;
a sub-vent hole which is formed in the main cushion and through which gas flowing into the main cushion is discharged;
a guide panel which has a communicating hole formed to be in communication with the sub-vent hole, and is coupled to the main cushion;
a vent cover which is disposed between the main cushion and the guide panel, and shields the sub-vent hole and the communicating hole;
a first strap which has one end coupled to the vent cover;
a tether remove unit which is disposed in the main cushion to be coupled to the other end of the first strap, and separated from the first strap by a control signal of a controller; and
a second strap which penetrates one side surface of the main cushion, and has one end coupled to the vent cover, and the other end coupled to the main cushion.

6. The airbag apparatus of claim 5, wherein when the first strap is separated from the tether remove unit, the vent cover is pulled by the second strap, and protrudes to the outside of the main cushion through the sub-vent hole by gas pressure in the main cushion while being moved forward so as to open the sub-vent hole and the communicating hole.

7. The airbag apparatus of claim 5, wherein a slit is further formed in the main cushion, and the second strap is inserted into the slit and penetrates the one side surface of the main cushion.

8. The airbag apparatus of claim 5, wherein the main cushion includes a main panel which has a front surface toward which the sub-cushion protrudes, and side panels which are coupled to both sides of the main panel and have the sub-vent holes, and the other end of the second strap is coupled to a coupling portion between the main panel and the side panel.

9. The airbag apparatus of claim 5, wherein a width of one end of the vent cover to which the first strap is coupled is narrower than a width of the other end of the vent cover to which the second strap is coupled.

* * * * *